INVENTOR.
WOLCOTT DENNIS

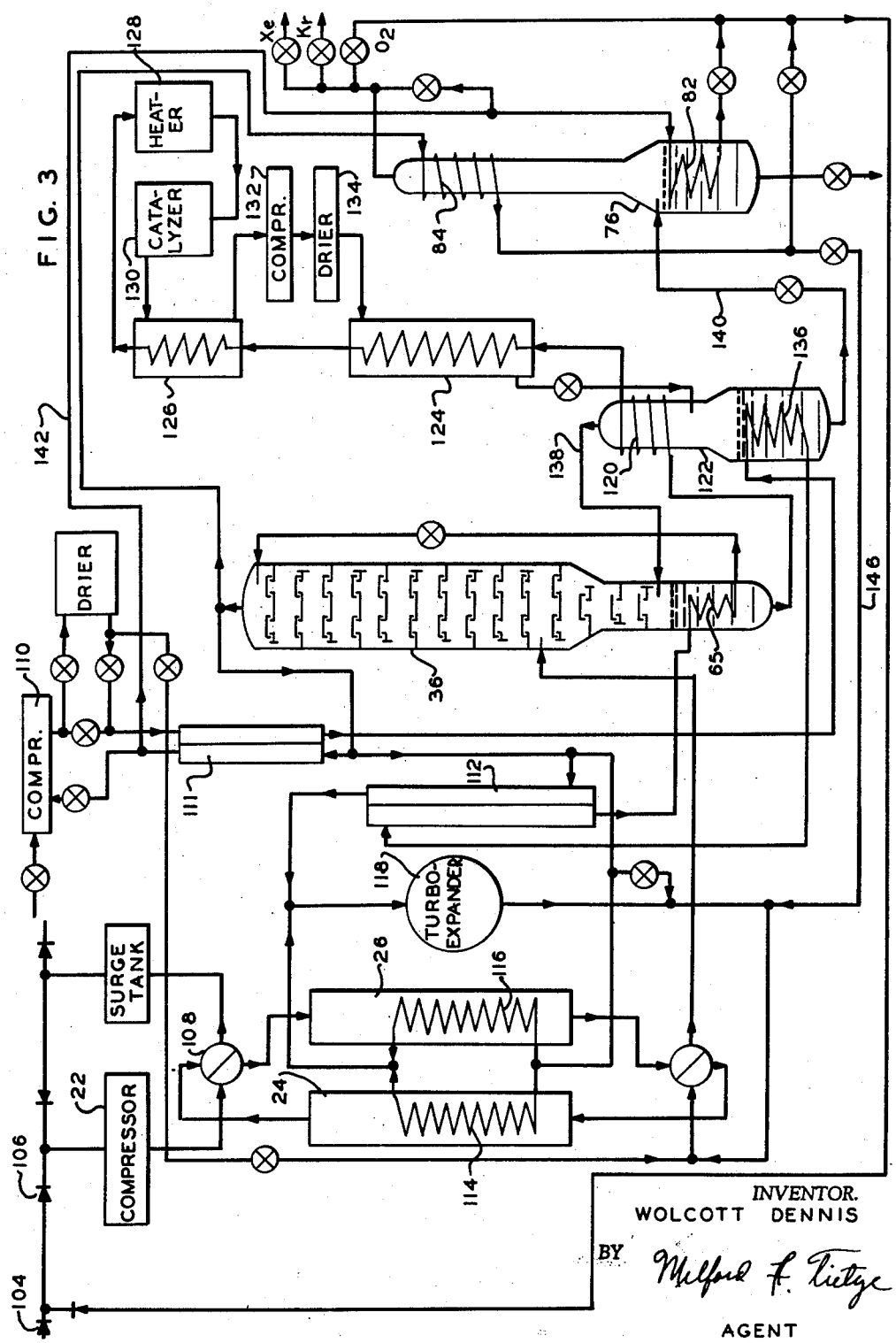

United States Patent Office 3,191,393
Patented June 29, 1965

3,191,393
KRYPTON-XENON SEPARATION FROM A GAS MIXTURE
Wolcott Dennis, Basking Ridge, N.J., assignor to Air Reduction Company, Incorporated, New York, N.Y., a corporation of New York
Filed Dec. 30, 1959, Ser. No. 863,013
2 Claims. (Cl. 62—42)

This invention relates to a method and apparatus for recovering elements such as krypton and xenon from gaseous mixtures such as atmospheric air or process streams containing the desired elements.

An object of the invention is to simplify the apparatus required in the recovery of rare gases.

Another object is to increase the purity and the proportion of recovery of the rare gases.

Another object is to improve the economy of heating and refrigeration in a recovery process.

A further object is to improve the temperature balance in the reversing regenerators or other heat exchangers employed in refrigerating the gaseous intake of the system.

A feature of the invention is a method in which a rare gas enriched fraction is formed in a preliminary rectification stage and this fraction is intermittently transferred to a batch still for fractional distillation of rare gases to yield high purity products.

Another feature is the use of an intermediate concentrating column between the first rectification and the fractional distillation in the batch still.

A further feature is the introduction of liquid nitrogen, liquid air or other refrigerant for use as a reflux and with the additional function to provide adequate refrigeration to meet the requirements of the process as a whole.

Other features include:

(1) Cooling the head condenser of the batch still by heat exchange with effluent waste gas from the primary rectification column.

(2) Returning vapors from the concentrating column to the primary column for recycling.

(3) A nitrogen or waste gas cycle wherein a portion of the effluent from the primary column is compressed and then successively cooled by reboiling the liquid in the concentrating still and reboiling the liquid in the primary column, whereupon the then condensed gas is returned to the top of the primary column to serve as reflux therein.

(4) Returning remaining fractions from the batch still to the compressors for recycling.

(5) Removing hydrocarbons from the process stream at a stage intermediate between two successive rectifications.

Other objects, features and advantages will appear from the following more detailed description of illustrative embodiments of the invention, which will now be given in conjunction with the accompanying drawings.

In the drawings,

FIG. 3 is a schematic diagram of another embodiment of the invention.

Figure 1:
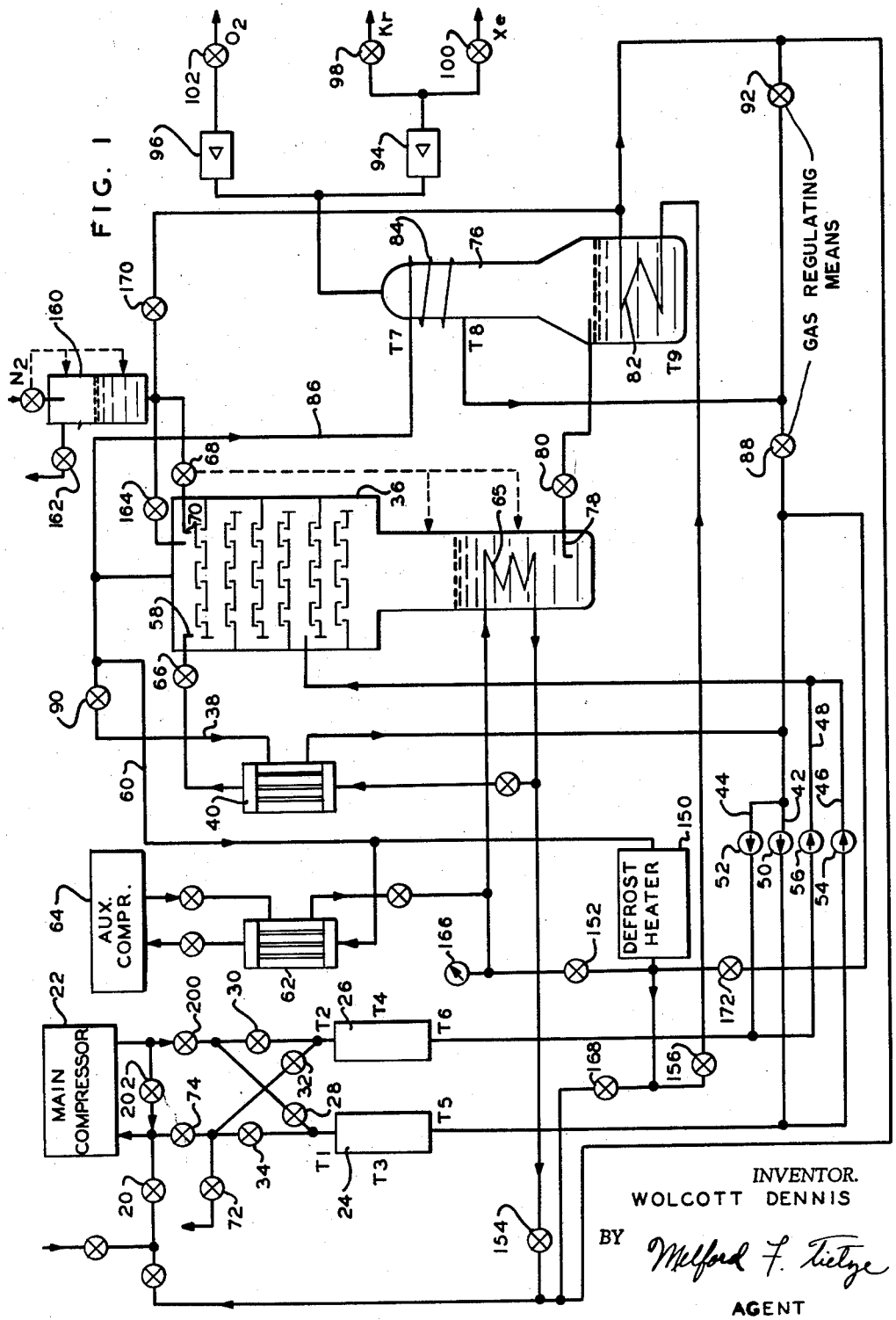
FIG. 1 is a schematic diagram of one embodiment of the invention.

Atmospheric air or any process stream containing components of relatively lower volatility such as krypton and xenon is admitted to the system of FIG. 1 through an input valve 20 and compressed to about 40 pounds per square inch absolute pressure in a compressor 22. The output of the compressor is arranged to feed into a pair of reversing regenerators 24, 26. The regenerators are used alternately in the usual manner, one regenerator being used for cooling the compressed stream while the other is being cooled and cleared of impurities, particularly water and carbon dioxide. The regenerators are shown with their warm ends upward in the drawing. Input valves into the warm end from the compressor are shown at 28 for the regenerator 24 and at 30 for the regenerator 26. When one of the valves 28, 30 is open the other is closed, and vice versa. Output valves 32 from the regenerator 26 and 34 from the regenerator 24 are provided, valve 32 being open when valve 30 is closed and valve 34 being open when valve 28 is closed. The compressed gas from the compressor 22 is passed for cooling into that one of the regenerators which has previously been cooled preferably by effluent cold gas from the top of a primary rectification column 36 where waste cold gas becomes available when the rectification process is once established, the effluent cold gas passing through a pressure regulating valve 90, a pipe 38, the outer passage of a subcooler 40, and parallel connected pipes 42 and 44 to the cold ends of the regenerators 24 and 26 respectively.

The cooled gas coming out of the regenerator passes through one or the other of outlet pipes 46, 48 to an intermediate point of the primary column 36. A set of check valves 50, 52, 54, 56 is provided at the cold end of the regenerators in the lines 42, 44, 46, 48, respectively, so that valves 28 and 54 may be open for the compressed gas from regenerator 24 to pass to the primary column while valves 52 and 32 are open to blow cold gas through regenerator 26; or valves 30 and 56 may be open for compressed gas from regenerator 26 while valves 50 and 34 are open to blow cold gas through regenerator 24, the remaining valves of both sets being closed in each case.

The upper portion of the primary rectification column is provided with the usual assemblage of plates for retarding the fall of the reflux liquid and for increasing the surfaces available for facilitating the mingling of the rising vapors and descending reflux. The vapors passing upward among the plates are stripped of krypton and xenon by the descending reflux which is admitted at the top of the column through one or both of inlet pipes 58 and 70. The enriched reflux passes downward to the lower, reboiler section of the column where it is reboiled to maintain a suitable level of liquid in the bottom.

Reboiling may be accomplished in either of the following ways. First, a cycle may be established by passing a small amount of waste gas from the top of the primary column through a pipe 60 and a heat exchanger 62 to an auxiliary compressor 64 which may be of the diaphragm type. In the compressor 64 the pressure of the gas may be raised to about 125 pounds per square inch gauge and the gas stream returned via the exchanger 62 to a reboil coil 65 immersed in the liquid at the bottom of the primary column where the gas is condensed as it gives up heat to boil off some of the liquid in the column. The condensed liquid from the reboil coil passes through the inner passage of the subcooler 40 and a relief valve 66 to the top of the column via the inlet pipe 58, furnishing part of the required reflux. In this method, the remainder of the reflux is supplied by admitting liquid nitrogen, liquid air or other suitable refrigerant at the top of the primary column via a valve 68 and the inlet pipe 70. The introduction of the liquid refrigerant has the additional purpose of providing necessary refrigeration for the process.

In a second method of reboiling, compressor 64 and heat exchanger 62 are shut down or not provided, and waste gas from the top of the primary column is passed through a valve 148 to a heater 150, and a valve 152 to the reboil coil 65 and out to recycle through a valve 154. In this method, all of the reflux is provided as liquid refrigerant to refrigerate the process. In an emergency such as failure of the compressor 64 or breakage of the diaphragm therein, this method may be used to avoid interruption of the process during repair of the compressor.

To cool and purify the regenerator that has been passing the compressed gas from the compressor 22, gas from the top of the primary column blows through the regenerator and may be passed out of the system through a valve 72, in which case the gas carries with it impurities such as water and carbon dioxide deposited in the regenerator during the previous half cycle.

The valves 28, 30, 32, 34 at the warm end of the regenerators may be operated automatically by a timer (not shown) so that the incoming process stream and the outgoing process stream switch from one regenerator to the other at intervals which may be about 160 seconds. A valve 74 in conjunction with the valve 72, both of which may be automatically controlled, permit the discharge from a regenerator to be diverted to the intake of the compressor 22 for a few seconds following reversal of the regenerators before discharging to the atmosphere. The purpose of this arrangement is to avoid loss of material in process which is under pressure in the regenerator at the time of reversal.

The foregoing portion of the process may be completely automatic and may be operated for long periods unattended. The product of this portion of the process collects in the reboiler portion of the primary column and may be allowed to accumulate until a concentration of about two percent or more of krypton and xenon is reached. It may then be drawn off either continuously at an appropriate rate or a batch at a time as into a batch still 76 through an outlet pipe 78 and a valve 80.

In an embodiment that has been successfully operated, the batch still consists of a pot of five liters volume with a small rectifier portion and condenser 84 at the top. The pot may be heated by warm gas as from the heater 150 passing through a valve 156 to a coil 82 immersed in the liquid at the bottom of the pot. The cooling fluid for the condenser comprises waste gas from the top of the primary column which passes downward through the condenser by way of a pipe 86 and may be returned to the cold end of the regenerators. Large flows of cooling fluid may be controlled by a valve 88 in the condenser outlet operated from a manual station at the control panel, while small flows may be controlled directly by an auxiliary valve 92 at the panel.

Products of fractional distillation produced in the batch still 76, principally krypton, xenon and oxygen, may be withdrawn at the top of the rectifier portion as through flow meters 94, 96, and valves 98, 100, 102. The valves may be placed at the control panel where the flow may be manually controlled to pass unwanted cuts back to the compressor intake and product cuts to appropriate storage facilities.

If liquid nitrogen is used to refrigerate the process, it should be maintained at a pressure of 40 to 50 pounds per square inch gauge. Since a considerable amount of vapor may be formed in the liquid transfer line, a separator 160 is provided in the cold box. Vapor reaching the separator is discharged by an automatic relief valve 162. Liquid is fed from the separator to the column as required through the valve 68 in response to the liquid level in the primary column reboiler by means of a level controller which may be located at the control panel.

Pressure values at the primary column, the batch still, and in the waste gas auxiliary cycle should be indicated at the panel and may be recorded there if desired. The primary column pressure and waste gas auxiliary cycle pressure may be controlled by relief valves 90 and 66, respectively, in the cold box assembly.

Temperatures necessary for control of the regenerators and for control of fractional distillation at the batch still may be indicated at the control panel and may be recorded there if desired.

The timer for controlling the duration of the regenerator half cycles and for controlling the timing of the valves for switching to recycle the regenerators at reversal may be located at the control panel. All streams taken from the process for various purposes should be returned to the inlet of the compressor 22 for recycling to avoid losses of wanted material. For this purpose, the valve 92 leads to a line which feeds back to the inlet valve 20.

All valves should be of the packless variety, sealed by bellows or diaphragm to avoid material losses.

Before starting the process, the apparatus should be thoroughly dried out. Then, valves 88 and 72 should be opened and valves 92 and 74 should be closed. Relief valve 90 opens automatically as the primary column pressure reaches normal. This will open the way for the dry vapor flash from the liquid nitrogen to blow through all the normally cold lines and out of the cold box when liquid nitrogen is first admitted.

This being done and instruments being in operation, the nitrogen supply valve 68 may be opened to let nitrogen liquid in. An auxiliary valve 164 of large flow capacity at the top of the cold box by-passes the control valve 68 and may be opened to allow quicker starting. As cooling progresses, the valve 162 blowing to atmosphere may be closed so as to put the entire flow of evaporated nitrogen through the regenerators, which should be reversing in the normal manner. In about one hour, the presence of liquid at the primary column reboiler should be indicated by the instruments, and temperatures T5, T6, at the cold end of the regenerators should be about −270 degrees F. Some over-filling of the reboiler is advantageous for accelerating the cooling of the regenerators.

At this point, the cycle involving the compressor 64 and the subcooler 40 may be started. Also, the compressor 22 may be started with the valve 200 to the regenerators shut off and the by-pass valve 202 open. The valve 200 may then be gradually opened while simultaneously closing the by-pass valve 202 until the desired flow is reached. This operation should be spread over a few minutes to avoid putting too much water in at the cold end at the regenerators before normal temperature distribution has been established.

Control of the liquid level in the reboiler should at first be approximately stabilized manually, as by manual operation of the normally automatic valve 68. After that, all control functions may be put into automatic operation.

If the second method of reboiling is used in which the compressor 64 is not used or is not provided, the emergency reboil circuit should be established as soon as the pressure in the main column is normal, about 25 pounds per square inch gauge. This pressure is maintained by relief valve 90. At normal reboil rate, the flow of reboil gas should bring the cycle flow as shown by an indicator 166 on the panel to a suitable value.

For some time after starting, the warm end temperature difference (T1−T2) will be small while the regenerators are cooling to normal operating condition. Gradually this temperature difference will increase, and when it has reached about 16 degrees F. it should be held at that amount by wasting some gas from the top of the primary column. A valve 168 is provided at the outlet of the defrost heater for this purpose.

It has been found that when the timers for the two regenerator half cycles are set at about 160 seconds each, the midpoint temperatures (T3 and T4) of the respective regenerators will vary with time in substantially identical patterns. Precisely similar patterns indicate that the regenerators are in exact balance and that the same amount of material passes through each regenerator in each half cycle. The regenerators are likely to be thrown out of balance by such conditions as unequal leaks in check valves or reversing valves, and by temporary flow changes which affect one regenerator differently from the other.

If it is necessary to balance the regenerators during operation, it should first be determined which timer is operating when the lowest cooling temperature is reached. That timer should then be adjusted to a shorter time or else the other timer should be adjusted to a longer time. When flows are steady and the reversing valves and check valves are tight, equal time intervals should give similar temperature patterns. The patterns will run in the range between −150 and −200 degrees F. with a normal warm end temperature difference of about 16 degrees F.

When sufficient concentration of rare gas has been obtained in the primary reboiler, the batch still condenser 84 should be cooled by opening valve 88 and the batch still pot should be cooled if it is not already below −130 degrees F. A valve 170 is provided at the top of the cold box for admission of liquid nitrogen to the heating coil 82 if the pot is too warm and cannot otherwise readily be cooled, but in normal operation use of this valve should not be necessary. With the batch still pot at −130 degrees F. or below, liquid can be transferred through valve 80 to the batch still 76, closing valve 80 when transfer is complete.

The batch still 76 is used for fractional distillation of oxygen, krypton and xenon from the enriched mixture obtained from the bottom of the primary column.

In the operation of the batch still, there should first be established a good flow of waste gas through valve 88 and the condenser 84. The batch still reboil valve 156 should then be opened part way, or about one-third turn. Flow through the reboil coil may then be at the rate of about 1.5 standard cubic feet per minute. The withdrawal valve 102 for oxygen may then be set for a flow of about 0.8 to 1.0 standard cubic feet per minute. After running this way for two or three hours, the temperature T9 of the pot will begin to rise, followed a little later by a rise in the temperature T8 at the bottom of the rectifier. As the temperature T8 rises, there will be a tendency for the pressure to fall off. As this fall starts, the flow of oxygen from the top of the condenser should be reduced to about 0.1 standard cubic foot per minute or less. Valve 88 should then be closed and the refrigeration regulated by valve 92 at the panel so that a pressure of 15 to 20 pounds per square inch gauge is maintained as well as possible while the temperature T7 at the top of the rectifier increases. During this time oxygen is being drawn off through the valve 102. Toward the end of the oxygen cut, the oxygen flow rate should be less than 0.05 standard cubic foot per minute. When T7 gets close to T8, it will be known that the oxygen cut is nearly complete and the krypton cut can be started by closing valve 102 and opening the krypton withdrawal valve 98. The valve 98 should be regulated with regard to the amount of the krypton available. If the krypton cut is small in total amount, the withdrawal rate may be 0.1 standard cubic foot per minute at the start, slowing down toward the end.

Eventually T8 will again rise while T7 remains at a more or less constant level until a tendency for the pressure to drop requires that the condenser refrigeration be reduced so that the condenser can warm up. T7 will then approach T8, and when T7 is about 20 degrees F. below T8, it is a sign that the krypton cut is substantially complete and that the xenon cut can be started.

The fractional distillation process may be continued in the above manner for as many cuts as may be required. The method given results in the admixture of a small amount of adjacent cuts in each product. With relatively small cuts, separate fractions of about 90% purity may be obtained. By returning the transition flows to recycle, higher purity fractions may be obtained.

An alternative method of operation of the batch still is to transfer liquid continuously to the still at a low rate, which may be about 0.5 standard cubic foot per minute. In this mode of operation, the condenser cooling valve 88 and the transfer valve 80 are left open and the batch still reboil valve 156 is left at one-third turn open. Operation in this manner may continue as long as five or six days or more. At the end of such a period the fractional distillation may be carried out as described above.

Figure 2:
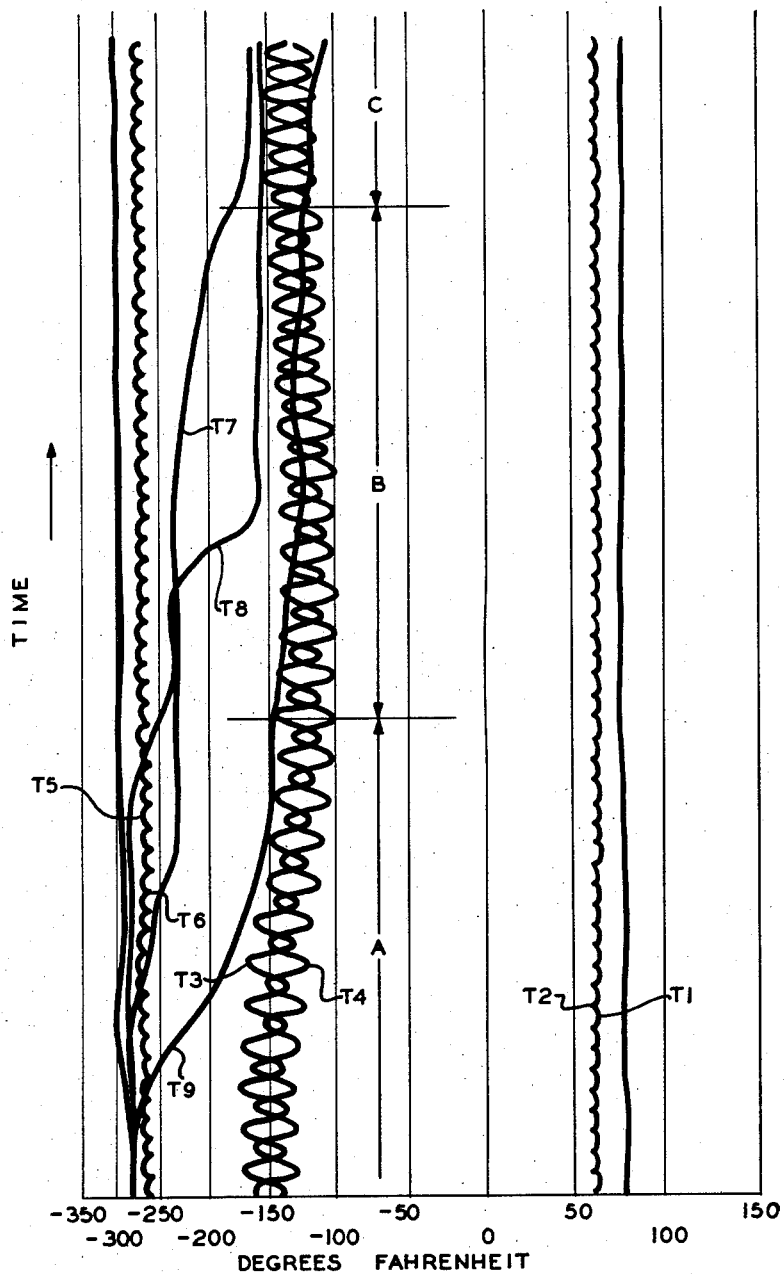
FIG. 2 is an illustrative chart of temperature variations in the regenerators and in the batch still.

FIG. 2 shows a typical temperature record of a batch still operation. During time interval A, oxygen is being removed, the temperature T7 at the top of the condenser remaining substantially at the boiling point of oxygen until near the end of this interval. It will be noted that the pot liquid T9 then warms up and the bottom of the condenser eventually arrives at the boiling point of krypton during this period.

At the beginning of the time interval B, T7 is close to T8, indicating that oxygen removal has been substantially completed. During this interval, krypton is withdrawn, the temperature T8 at the bottom of the rectifier rising to the boiling point of xenon, followed later by an approach of temperature T7 to the xenon boiling point at which point the krypton cut is substantially completed. During the time interval C, xenon is being removed.

Defrosting may be necessary after a week or more of continuous operation of the apparatus, the defrost heater 150 and a valve 172 being used for this purpose. Need for defrosting will become evident when a pressure drop begins to build up in the regenerators due to accumulation of ice, solidified carbon dioxide and other deposited materials.

The first step in defrosting is to transfer all liquid contents of the primary column to the batch still and exhaust the product gases from the system, as by means of the evaporated liquid nitrogen. When this has been done, the liquid nitrogen supply should be shut off and the defrost heater started. The valves 148 and 172 should be opened to permit passage of gas from the column through the heater and back to the cold box. The heater thermostat should be set at from 200 to 250 degrees F. The auxiliary primary column reboil circuit or the compressor 64 should be shut down.

If the primary column and internal piping are known to contain water, the defrosting operation must be continued until the temperature indicators or recorders show that all temperatures are well above ambient. The transfer valve 80 in the batch still should be open and the batch still drain should be checked for dryness.

If there is evidence that only the regenerators are fouled, then defrosting need continue only until a temperature in the vicinity of −100 degrees F. has been obtained at T5 and T6. This will insure the removal of solids such as carbon dioxide and water from the regenerators but will not wet the column or the cold equipment by a defrosting stream containing moisture. This shorter defrosting procedure should not require over two hours and it should be possible to get the apparatus back into full operation in another hour.

If the feed gas admitted through the valve 20 is made sufficiently dry and free of carbon dioxide, as by means of auxiliary driers and purifiers or otherwise, a simple heat exchanger may be substituted for the pair of regenerators.

In the modified apparatus shown in FIG. 3, the atmospheric air or other gases containing krypton and xenon are admitted to the compressor 22 through check valves 104 and 106, and compressed to two or three atmospheres. The output from the compressor 22 is blown into and through one or the other of the regenerators 24 and 26 by way of a reversing valve 108. The regenerators are used alternately as before. In the regenerators the compressed gaseous mixture is cooled and impurities such as water and carbon dioxide are condensed out. The cooled and purified gas from the regenerators is admitted to an intermediate region of the primary rectification column 36. In the upper portion of the column 36 krypton and xenon are stripped from the rising vapors by descending reflux as in the apparatus shown in FIG. 1. The primary column operates at substantially the output pressure of the compressor 22, about two or three atmospheres.

Boiling and refluxing for the primary column are obtained by compressing a suitable portion of the waste gas from the top of the column to about ten atmospheres in a compressor 110, with countercurrent heat exchange in an exchanger 111, liquefying a portion of the compressed gas by heat exchange with cooler waste gas passing through a liquefier 112, and liquefying the remainder by heat transfer from the reboil coil 65 to concentrated liquid in the base of the column. The liquefied 10-atmosphere gas is thereafter throttled into the top of the column 36 where it serves as the reflux to strip out the krypton and xenon.

A small portion of the waste gas from the top of the column 36 passes through refrigerating coils 114 and 116 in or around the regenerators 24 and 26 respectively, to furnish refrigeration requisite to maintain a suitable temperature balance. The waste gas portion then joins the main portion of waste gas as it leaves the liquefier 112, the mixed gas passing into a turbo-expander 118 at a temperature of about 18 to 27 degrees F. above saturation. In the expander, the gas is cooled to about saturation at a pressure slightly above atmospheric pressure.

A liquid fraction containing a concentration of one to five percent krypton and xenon, together with some hydrocarbons, is withdrawn from the primary column, vaporized in a condenser coil 120 at the top of a concentrator column 122, brought to room temperature in heat exchanger 124, heated in a heat exchanger 126 and a heater 128, passed through a catalyzer unit 130 to burn out the hydrocarbons, compressed to 200 to 300 pounds per square inch absolute in a compressor 132, dried in a drier 134, cooled in the heat exchanger 124 and introduced into the intermediate portion of the concentrator 122.

The concentrator 122 is a rectification column, which may be smaller than the primary column, and in which liquid is boiled by heat transfer from the fluid in the 10-atmosphere cycle circulating in a reboil coil 136, the same fluid that also circulates in the reboil coil 65 of the primary column. Reflux for the concentrator is condensed by the vaporizing of the liquid fraction withdrawn from the primary column circulating in the condenser 120. Gas from the top of the concentrator is returned to the lower portion of the primary column through a pipe 138. A concentrated liquid fraction containing 10 to 50% of krypton and xenon collects in the base of the concentrator 122.

At appropriate intervals, the product from the bottom of the concentrator is transferred to the batch still 76 through a pipe 140.

The batch still 76 is boiled by warm process gas circulating through the reboil coil 82. This gas may come from the inlet of the compressor 110 through a pipe 142. Reflux for the batch still is obtained by heat transfer to cold waste gas from the top of the primary column circulated through the condenser coil 84.

The operation of the batch still is substantially the same as has been described above in connection with the apparatus shown in FIG. 1.

In the first part of the batch still operation in either of the illustrated embodiments, when oxygen is being taken off at the top, a considerable flow of cold gas is required. This leaves the batch still reflux condenser 84 at relatively low temperature. To conserve refrigeration in the embodiment of FIG. 3, the cold gas may then be returned through a pipe 146 to the outlet side of the turbo-expander 118 and thence to the regenerator that is in the cooling portion of its cycle. In the subsequent batch still operations only a minor amount of cold gas is needed for refluxing the batch still.

A definite advantage is obtained in the operation of the batch still by using a gaseous medium for cooling the condenser 84 rather than a liquid medium. Whereas a liquid refrigerant in the condenser would maintain a nearly uniform temperature from end to end of the condenser coil, a gaseous refrigerant can maintain a considerable temperature drop along the length of the coil. Thus, if the cool end of the coil is maintained somewhat below the boiling temperature of oxygen, the temperature at the warm end of the coil may be varied from time to time according to whether oxygen, krypton or xenon is being withdrawn. During an oxygen cut, as above mentioned, a large flow of gaseous refrigerant may be maintained through the coil 84 to keep the temperature rise in the coil small, thereby condensing out any krypton or xenon which may rise to the level of the bottom of the coil. Then, during a krypton cut, the flow of refrigerant in the coil 84 may be reduced with resultant warming of the coil until the temperature at the warm end of the coil is just above the boiling point of krypton, thereby condensing out xenon while maintaining the temperature along the coil 84 close to the temperature in the adjacent portion of the still. During a xenon cut, the flow of refrigerant in the coil may be still further reduced until the warm end of the coil is just above the boiling point of xenon. The temperature at the warm end of the coil may always be high enough to prevent freezing of krypton or xenon in the upper portion of the batch still. Also, the heat transfer between the coil 84 and the adjacent contents of the batch still occurs at high efficiency due to the reduced temperature differences at which the transfer occurs.

The arrangement of FIG. 3 is more conservative of heat and of refrigeration, in general, than the arrangement of FIG. 1 and is economical for handling greater rates of flow of process materials.

It will be understood that where krypton alone is mentioned, xenon is intended to be included, except where separation as between the two is involved.

While illustrative forms of apparatus and methods in accordance with the invention have been described and shown herein, it will be understood that numerous changes may be made without departing from the general principles and scope of the invention.

What is claimed is:

1. In apparatus for recovering krypton and xenon from a process stream containing these elements, a primary rectification column, a concentrating column, means to transfer an enriched liquid fraction from said primary column to said concentrating column, said transfer means comprising the following: condensing means at the top of said concentrating column connected to receive said enriched liquid fraction from said primary column, wherein said enriched liquid fraction is vaporized by heat transfer from said condensing means to form an enriched evaporated fraction, thereby forming reflux in said concentrating column by condensation of vapor therein, catalyzing means connected to said condensing means, wherein said enriched evaporated fraction is treated for removal of hydrocarbons, and means for introducing into the concentrating column as feed thereto the fraction thus freed from hydrocarbons; reboiling means in said concentrating column heated by low boiling effluent from said primary column whereby krypton-xenon rich liquid accumulates in said concentrating column, means to return reboiled vapor from said concentrating column to said primary column, a simple batch still, means for intermittently transferring accumulated krypton-xenon rich liquid from said concentrating column to said simple batch still for fractional distillation of krypton and xenon, said batch still having a top condenser refrigerated by low boiling effluent from said primary column and having a reboiler heated by warmed up low boiling effluent from said primary column, and means for withdrawing the fractionally distilled krypton-xenon from the still, the withdrawal operating in accord with the temperature of the top condenser.

2. In apparatus for recovering krypton and xenon from a process stream containing these elements, a primary rectification column, means for feeding said process stream into said rectification column, means in said column to separate said process stream into effluent cold gas and an oxygen-krypton-xenon enriched liquid fraction, a concentrating column, means for transferring an oxygen-krypton-xenon enriched liquid fraction from said primary column to said concentrating column, means in said concentrating column to produce therein a concentrated oxygen-krypton-xenon liquid fraction, a simple batch still having a boiler portion and a condenser portion, means for heating said boiler portion, cooling means comprising an extended gas conduit in thermal exchange relation with rising vapors in said condenser portion, means for transferring said concentrated oxygen-krypton-xenon liquid fraction from said concentrating column to said still, a compressor for effluent cold gas, means to feed a portion of effluent cold gas from said primary column to said compressor, means employing compressed gas from the outlet of said compressor to reboil serially said liquid fraction in said primary column and said liquid fraction in said concentrating column, whereby to liquefy the said compressed gas, means to expand said liquefied gas and deliver the same into said primary column as reflux therein, means to pass a second portion of effluent cold gas from said primary column through said extended gas conduit to cool said condenser portion of the still, means to regulate the rate of flow of gas through said extended gas conduit to control the temperature in said condenser portion of the still to effect fractional distillation of said oxygen-krypton-xenon enriched fraction in said still, and means for withdrawing fractionally distilled products from the still, said means operating in accord with the temperature of the condenser portion.

References Cited by the Examiner

UNITED STATES PATENTS

| | | | |
|---|---|---|---|
| 1,215,957 | 2/17 | Newes | 62—39 |
| 1,426,461 | 8/22 | Claude | 62—22 |
| 1,772,202 | 8/30 | Blaringham | 62—22 |
| 1,963,809 | 6/34 | Schuftan | 62—22 |
| 2,040,116 | 5/36 | Wilkinson | 62—22 |
| 2,057,459 | 10/36 | Van Nuys | 62—30 X |
| 2,060,940 | 11/36 | Kahle | 62—22 |
| 2,270,880 | 1/42 | Kahle | 62—22 |
| 2,482,304 | 9/49 | Van Nuys | 62—31 X |
| 2,530,602 | 11/50 | Dennis | 62—22 |
| 2,548,377 | 4/51 | Kapitza | 62—39 |
| 2,581,088 | 1/52 | Etherington | 62—34 |
| 2,608,070 | 8/52 | Kapitza | 62—33 |
| 2,626,510 | 1/53 | Schilling | 62—14 |
| 2,633,717 | 4/53 | Paget | 62—42 |
| 2,655,796 | 10/53 | Rice | 62—14 |
| 2,698,523 | 1/55 | Hnilicka | 62—22 X |
| 2,700,282 | 1/55 | Roberts | 62—22 |
| 2,713,781 | 7/55 | Williams | 62—34 |
| 2,716,332 | 8/55 | Haynes. | |
| 2,785,548 | 3/57 | Becker. | |
| 2,919,556 | 1/60 | Mulder | 62—42 |
| 2,960,838 | 11/60 | Denton | 62—39 X |
| 2,982,107 | 5/61 | Smith | 62—22 |

FOREIGN PATENTS

| | | |
|---|---|---|
| 47,423 | 1/37 | France. |
| 434,193 | 8/35 | Great Britain. |
| 434,194 | 8/35 | Great Britain. |

OTHER REFERENCES

Kirschbaum: Distillation and Rectification, Chemical Publishing Company, Incorporated, New York, 1948, pp. 71–80 (TP 145 D5K5).

NORMAN YUDKOFF, *Primary Examiner.*

ROBERT A. O'LEARY, EDWARD J. MICHAEL,
*Examiners.*